(12) United States Patent
Rarick et al.

(10) Patent No.: US 7,443,981 B1
(45) Date of Patent: Oct. 28, 2008

(54) EXECUTION UNIT FOR PERFORMING THE DATA ENCRYPTION STANDARD

(75) Inventors: Leonard D. Rarick, San Diego, CA (US); Christopher H. Olson, Austin, TX (US)

(73) Assignee: Sun Microsystems, Inc, Santa Clara, CA (US)

( * ) Notice: Subject to any disclaimer, the term of this patent is extended or adjusted under 35 U.S.C. 154(b) by 807 days.

(21) Appl. No.: 10/676,554

(22) Filed: Oct. 1, 2003

(51) Int. Cl.
*H04K 1/00* (2006.01)
(52) U.S. Cl. .......................................... 380/29
(58) Field of Classification Search .................... 380/29
See application file for complete search history.

(56) References Cited

OTHER PUBLICATIONS

Bruce Schneier, Applied Cryptography, 1996, John Wiley and Sons, Second edition, pp. 270-278.*
U.S. Appl. No. 10/057,172, Rarick, System and Method for Small Read Only Data, filed Jan. 25, 2002.
Menezes et al., Handbook of Applied Cryptography, 1997, ISBN 0-8493-8523-7, Section 7 pp. 228-233 and 250-260.
National Institute of Standards and Technology, Data Encryption Standard (DES), Oct. 25, 1999, FIPS Pub 46-3.

\* cited by examiner

*Primary Examiner*—Kambiz Zand
*Assistant Examiner*—Jacob Lipman
(74) *Attorney, Agent, or Firm*—Park, Vaughan & Fleming LLP

(57) ABSTRACT

An execution unit adapted to perform at least a portion of the Data Encryption Standard. The execution unit includes a Left Half input; a Key input; and a Table input. The execution unit also includes a first group of transistors configured to receive the Table input, perform a table look-up, and output data. The execution unit further includes a first exclusive-or operator having two inputs and an output. The first exclusive-or operator is configured to receive the Left Half input and the Key input. The execution unit also includes a second exclusive-or operator having two inputs and an output. The second exclusive-or operator is configured to receive the data output by the first group of transistors and to receive the output of the first exclusive-or operator. The execution unit also includes a third exclusive-or operator having two inputs and an output. The third exclusive-or operator is configured to receive the Left Half input and the data output by the first group of transistors.

12 Claims, 13 Drawing Sheets

EXECUTION UNIT FOR PERFORMING THE DATA ENCRYPTION STANDARD

1. FIELD OF THE INVENTION

The present invention relates to computer hardware for efficiently implementing the Data Encryption Standard public key encryption algorithm.

2. BACKGROUND

Figure 1:
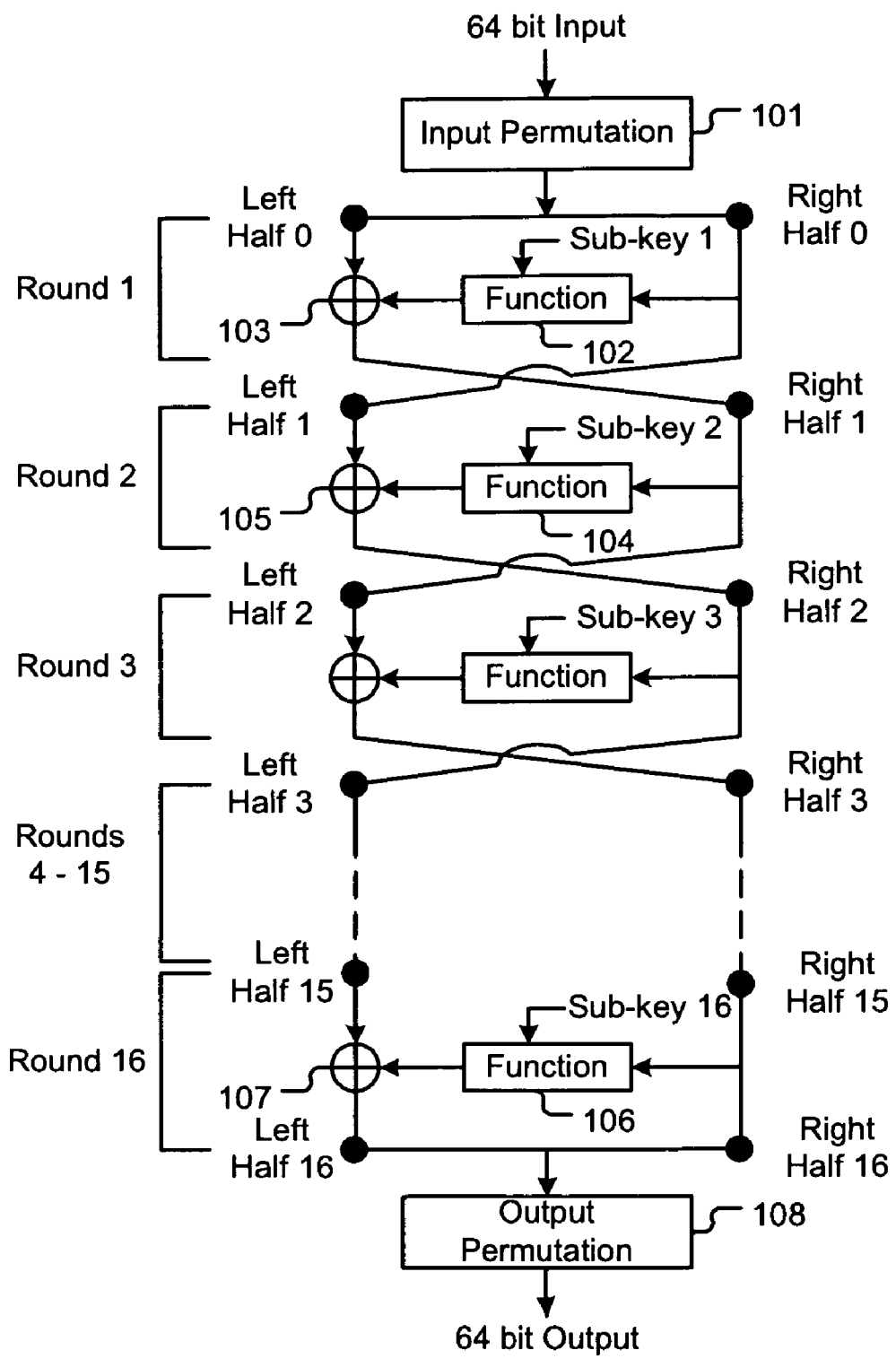

The Data Encryption Standard public key encryption algorithm ("DES") is a symmetric-key encryption developed in 1975 and standardized by the American National Standards Institute ("ANSI") in 1981 as the ANSI X.3.9.2 standard. DES utilizes a single key to encrypt and decrypt a message. Additional information regarding the DES algorithm can be found in the Handbook of Applied Cryptography by Menezes, Oorschot, and Vanstone, CRC Press, 1997;

As shown in FIG. 1, the DES algorithm takes as input a 64-bit text message. It also takes as input a 64-bit key (not shown). However, only 56 of the 64 bits are utilized. From these 56 bits, 16 48-bit sub-keys are created. The first step in encrypting a 64-bit message, as shown in Block 101 of FIG. 1, is to permutate the 64-bit input message. While software implementations of the DES algorithm require significant time to perform this permutation, hardware implementations of the DES algorithm can perform this permutation by appropriately routing signals so that no transistors are required and no significant delay occurs.

Referring again to FIG. 1, the result of the input permutation is divided into two 32-bit halves. The lower 32 bits will be referred to as the Right Half 0. The upper 32 bits will be referred to as the Left Half 0.

The Right Half 0 and sub-key 1 are input into "function" logic block 102. The "function" logic block 102 will be discussed more fully below. The output of "function" logic block 102 and the Left Half 0 are input into an exclusive-or operator 103. The exclusive-or operator is represented with a circle around a "+" symbol. As shown in FIG. 1, the processing of the Right Half 0 and the Left Half 0 by "function" block 102 and the exclusive-or operator 103 will be referred to as Round 1.

After the completion of Round 1, the output of the exclusive-or operator 103, which will be referred to as Right Half 1, and sub-key 2 are input into "function" logic block 104. The output of "function" logic block 104 and Right Half 0, which will also be referred to as Left Half 1, are input into exclusive-or operator 105. The processing of the Right Half 1 and the Left Half 1 by "function" block 104 and the exclusive-or operator 105 will be referred to as Round 2.

As shown in FIG. 1, Round 3 and Rounds 4 through 15 are identical to Round 2.

Round 16 includes inputting the Right Half 15 and sub-key 16 into "function" logic block 106. The output of "function" logic block 106 and Left Half 15, are input into exclusive-or operator 107.

After the completion of Round 16, the Right Half 16 and the Left Half 16 are combined to form a 64-bit number. The 64-bit number is then permutated by output permutation block 108. The permutation performed by output permutation block 108 is the inverse of the permutation performed by input permutation block 101. The result of the output permutation block 108 is 64 DES encrypted bits.

Figure 2:
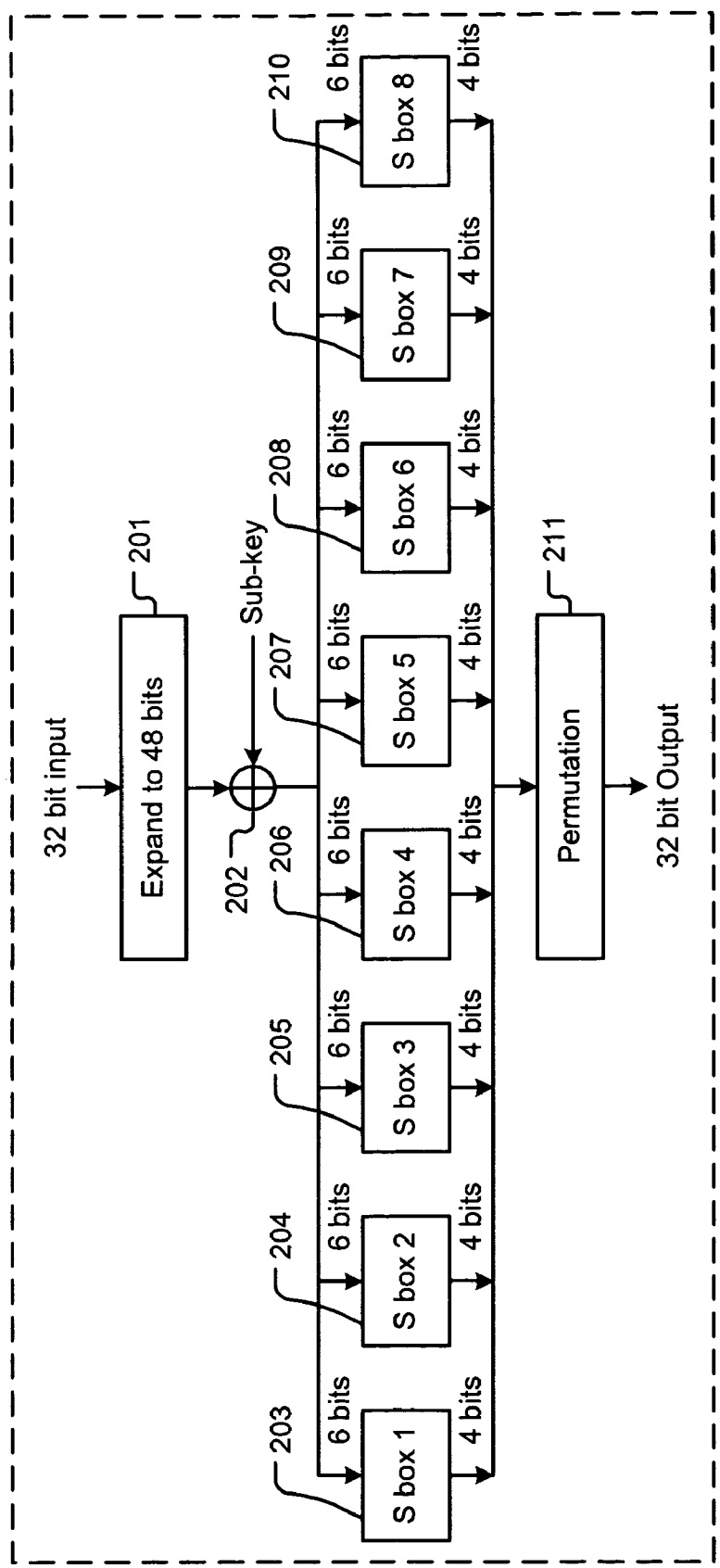

As discussed above, FIG. 1 includes 16 "function" logic blocks (four of which are shown). FIG. 2 presents a diagram of a "function" logic block. As shown in block 201 of FIG. 2, the 32-bit input to the "function" block is expanded to 48 bits by duplicating half of the 32 bits. In software implementations of the DES algorithm, this expansion takes a significant amount of time. However, in hardware implementations of the DES algorithm, the expansion can be performed by appropriately routing signals so that no transistors are required and no significant delay occurs. Next, the expanded 48 bits and a sub-key are input into exclusive-or operator 202. The result of the exclusive-or operation is split into eight groups. Each of these groups contains 6 bits. Each group of 6 bits is then input into one of eight S boxes 203-210. The S boxes perform table look-ups and output eight groups of 4 bits. For example, if the value of the 6 bit input group is k, then the S box would output the kth 4 bit entry in the S box's table. Each S box utilizes a different table. Typically, S boxes are implemented utilizing high-speed random access memory ("RAM"). The eight 4-bit outputs of the S boxes are then combined and permutated as shown in Block 211 of FIG. 2. In software implementations of the DES algorithm, the permutation takes a significant amount of time. However, in hardware implementations of the DES algorithm, the permutation can be performed by appropriately routing signals so that no transistors are required and no significant delay occurs.

Figure 3:
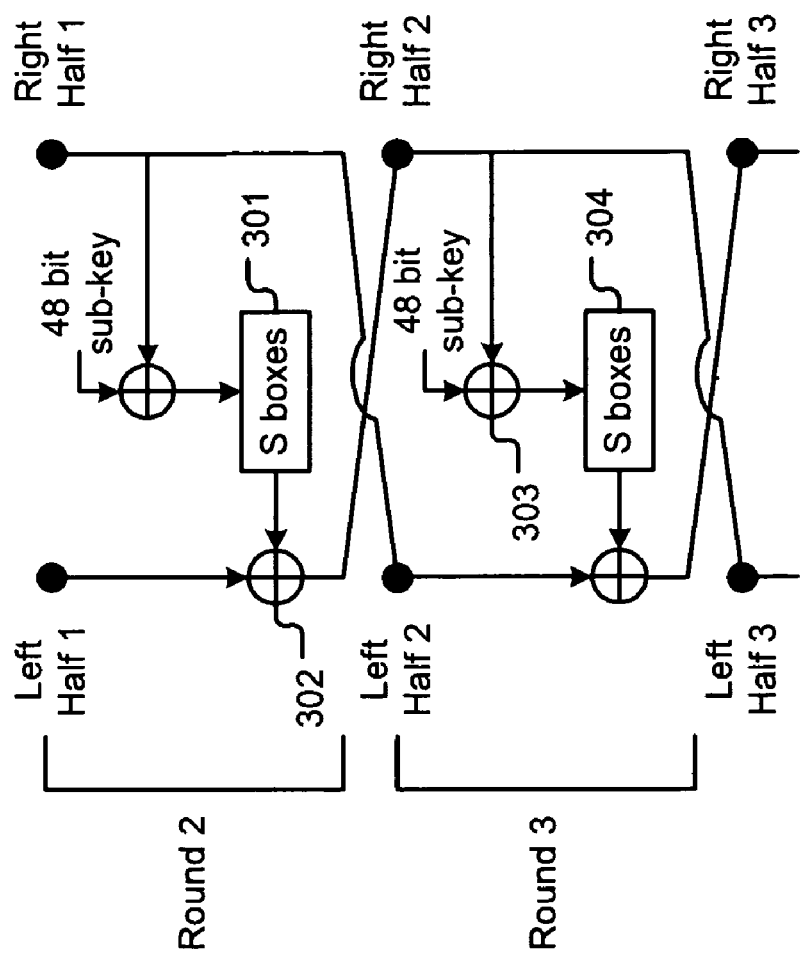

FIG. 3 presents a simplified version of rounds 2 and 3 of a conventional hardware implementation of the DES algorithm. Because permutations and expansions can be performed by routing signals without the use of transistors, and hence do not impact the speed of execution of a hardware implementation of the DES algorithm, the permutations and expansions are not shown in FIG. 3. As is evident from FIG. 3, the critical path between S boxes 301 and S boxes 304 includes two exclusive-or operators 302 and 303.

As modern computers need to encrypt and decrypt large amounts of data using the DES algorithm, a need exists to increase the speed of hardware executed DES algorithms. Thus, there is a need to shorten the critical path between S boxes in hardware implementations of the DES algorithm.

3. SUMMARY OF THE INVENTION

One embodiment of the invention is an execution unit that includes a Left Half input; a Key input; and a Table input. The execution unit also includes a first group of transistors configured to receive the Table input, perform a table look-up, and output data. The execution unit further includes a first exclusive-or operator having two inputs and an output. The first exclusive-or operator is configured to receive the Left Half input and the Key input. The execution unit also includes a second exclusive-or operator having two inputs and an output. The second exclusive-or operator is configured to receive the data output by the first group of transistors and to receive the output of the first exclusive-or operator. The execution unit also includes a third exclusive-or operator having two inputs and an output. The third exclusive-or operator is configured to receive the Left Half input and the data output by the first group of transistors.

4. BRIEF DESCRIPTION OF THE FIGURES

FIG. 1 presents a high-level view of the DES algorithm.

FIG. 2 presents a more detailed view of the "function" logic block of FIG. 1.

FIG. 3 presents a simplified version of rounds 2 and 3 of a conventional hardware implementation of the DES algorithm.

Figure 4:
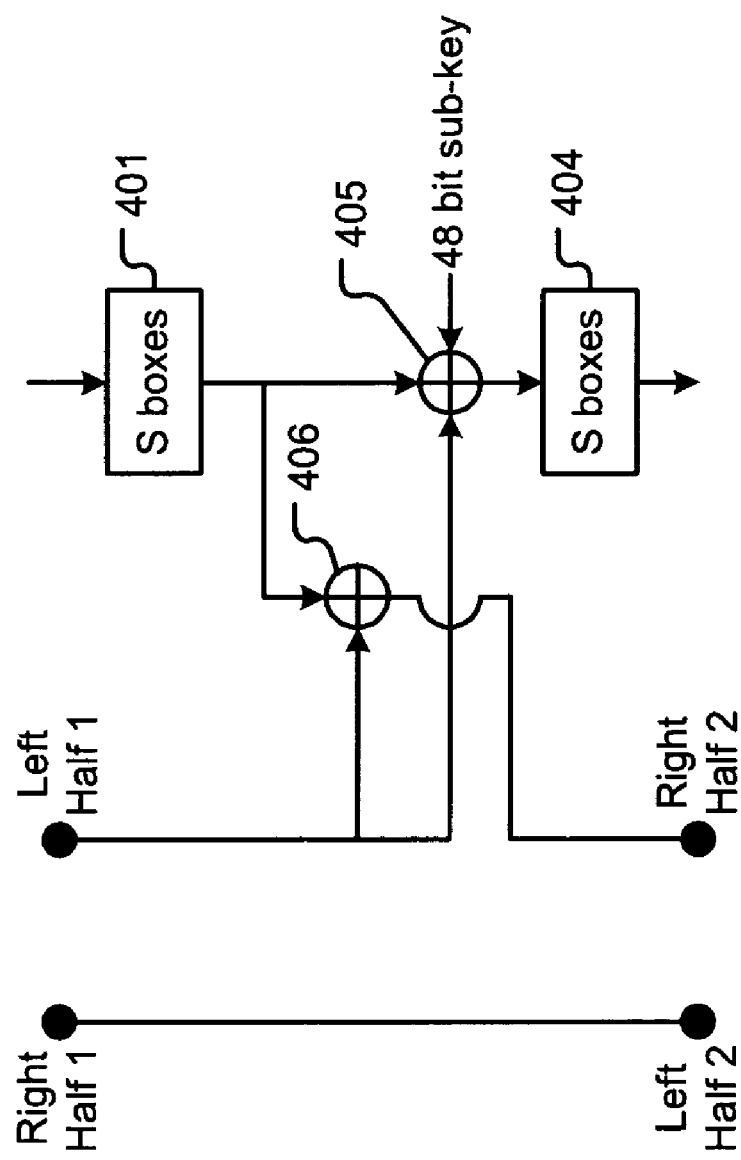

FIG. 4 presents an enhanced version of a DES hardware implementation.

Figure 5:
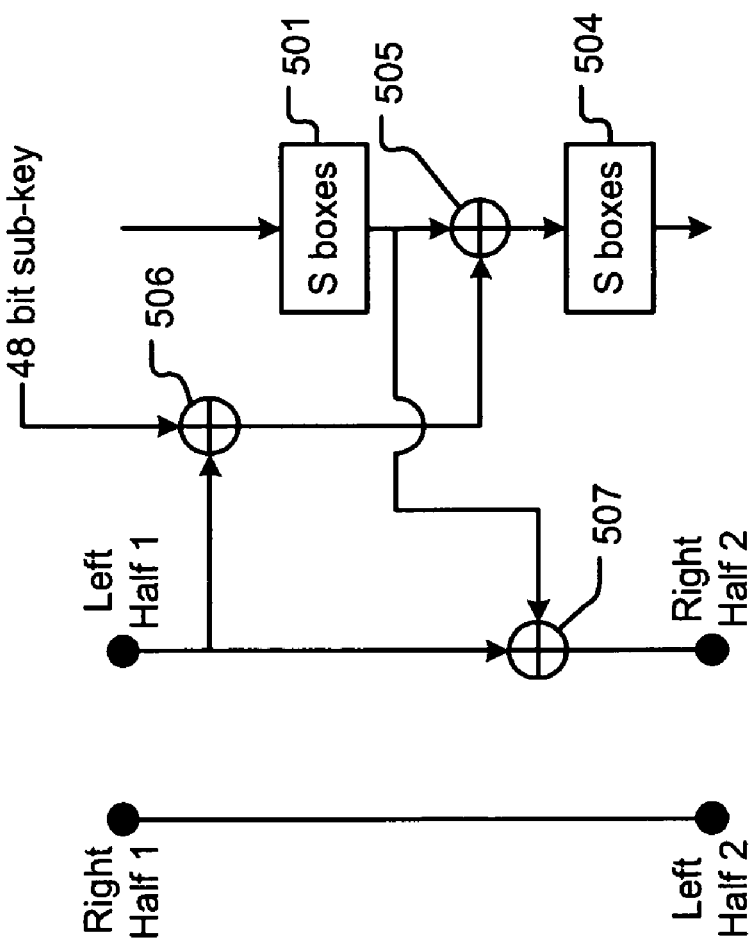

FIG. 5 presents another enhanced version of a DES hardware implementation.

Figure 6:
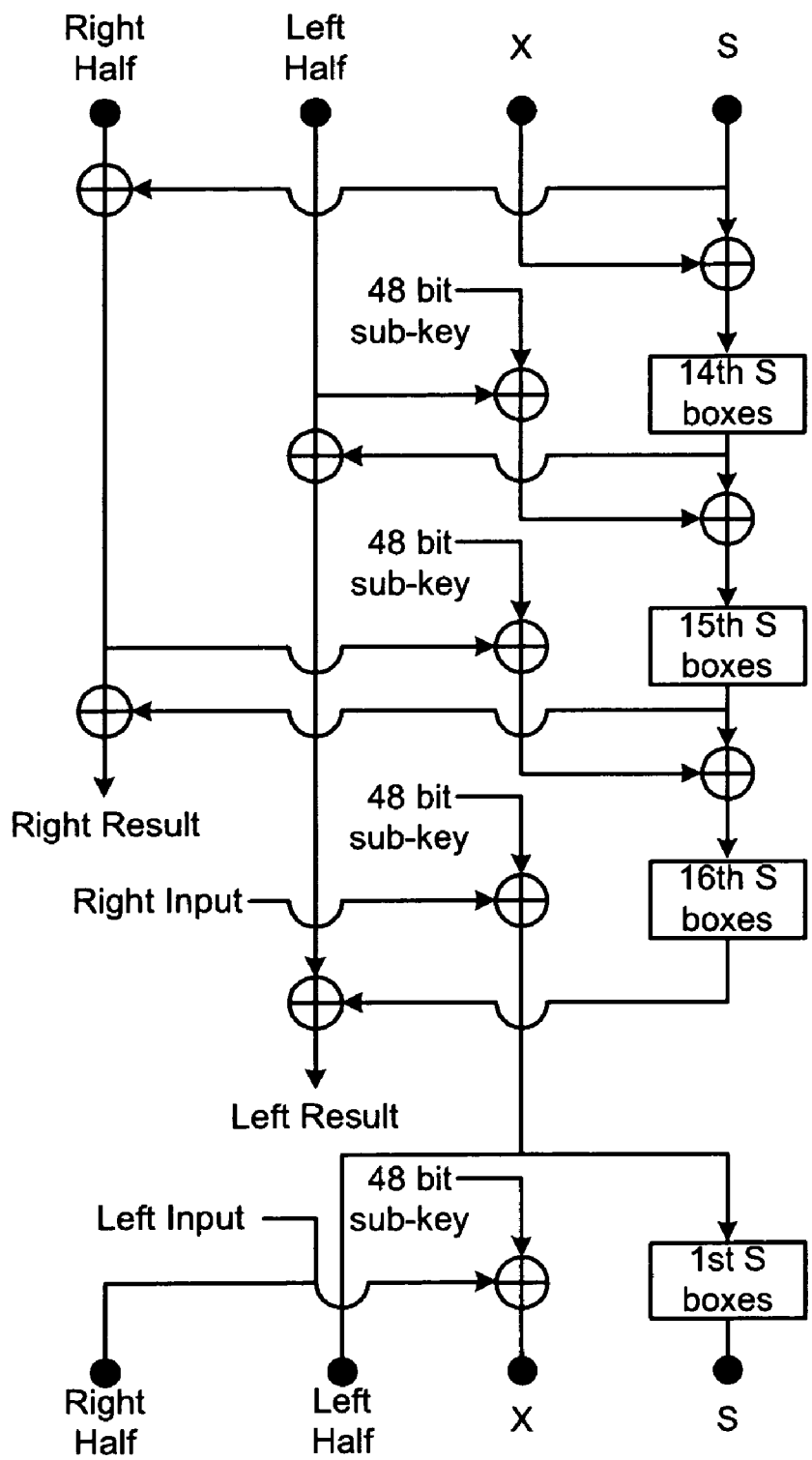

FIG. 6 presents yet another enhanced version of a DES hardware implementation.

Figure 7:
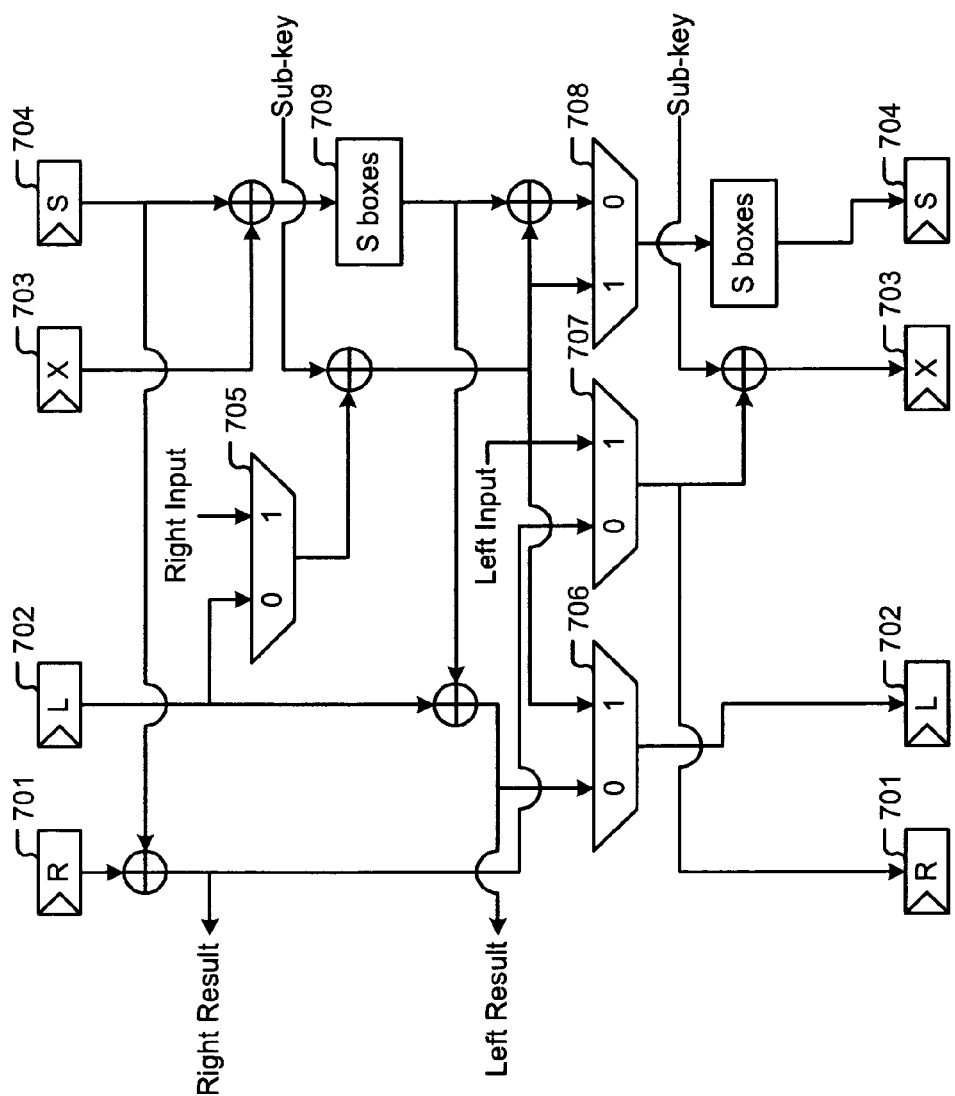

FIG. 7 presents a version of a DES hardware implementation that can perform all 16 rounds of a DES algorithm.

Figure 8:
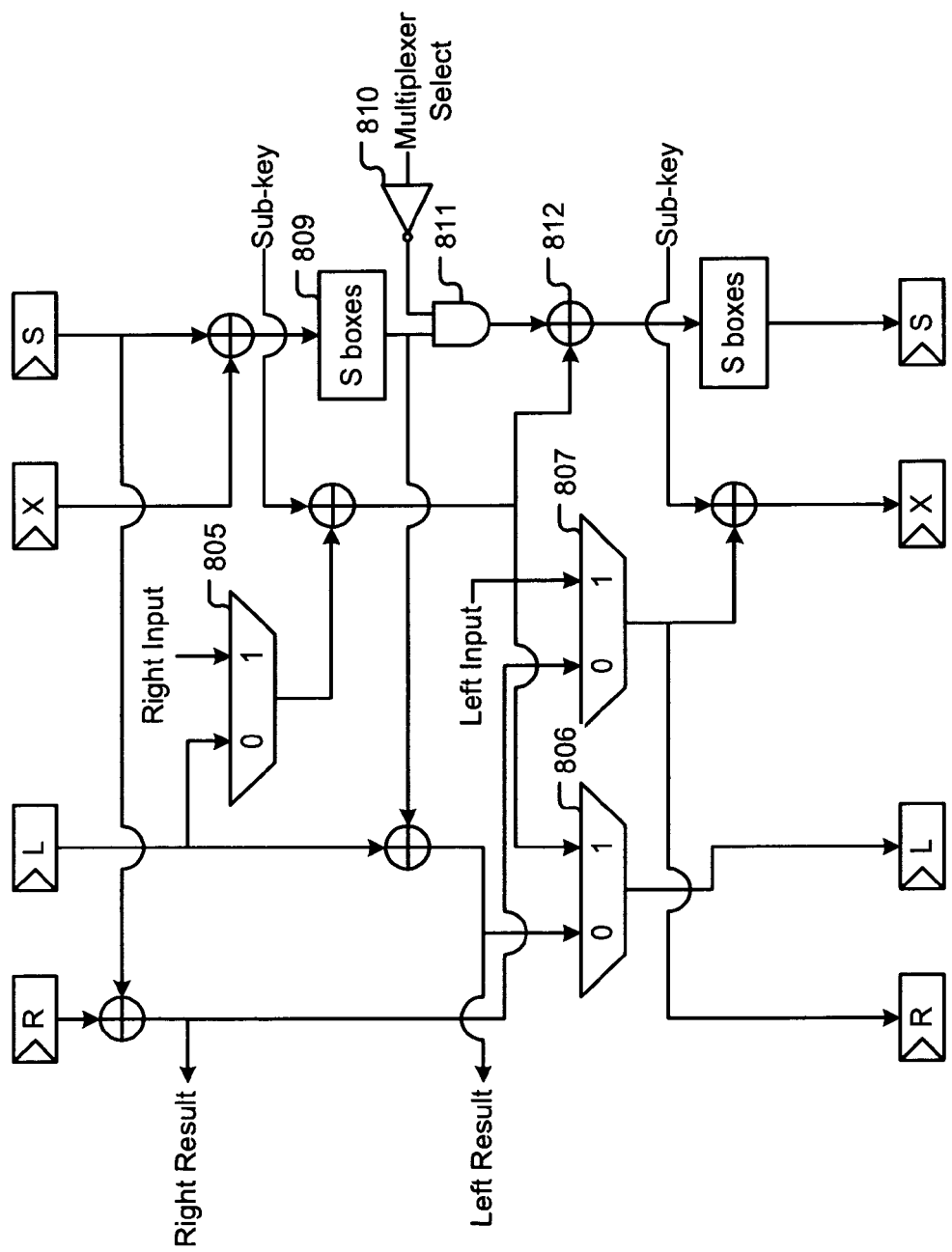

FIG. 8 presents another version of a DES hardware implementation that can perform two rounds per clock cycle.

Figure 9:
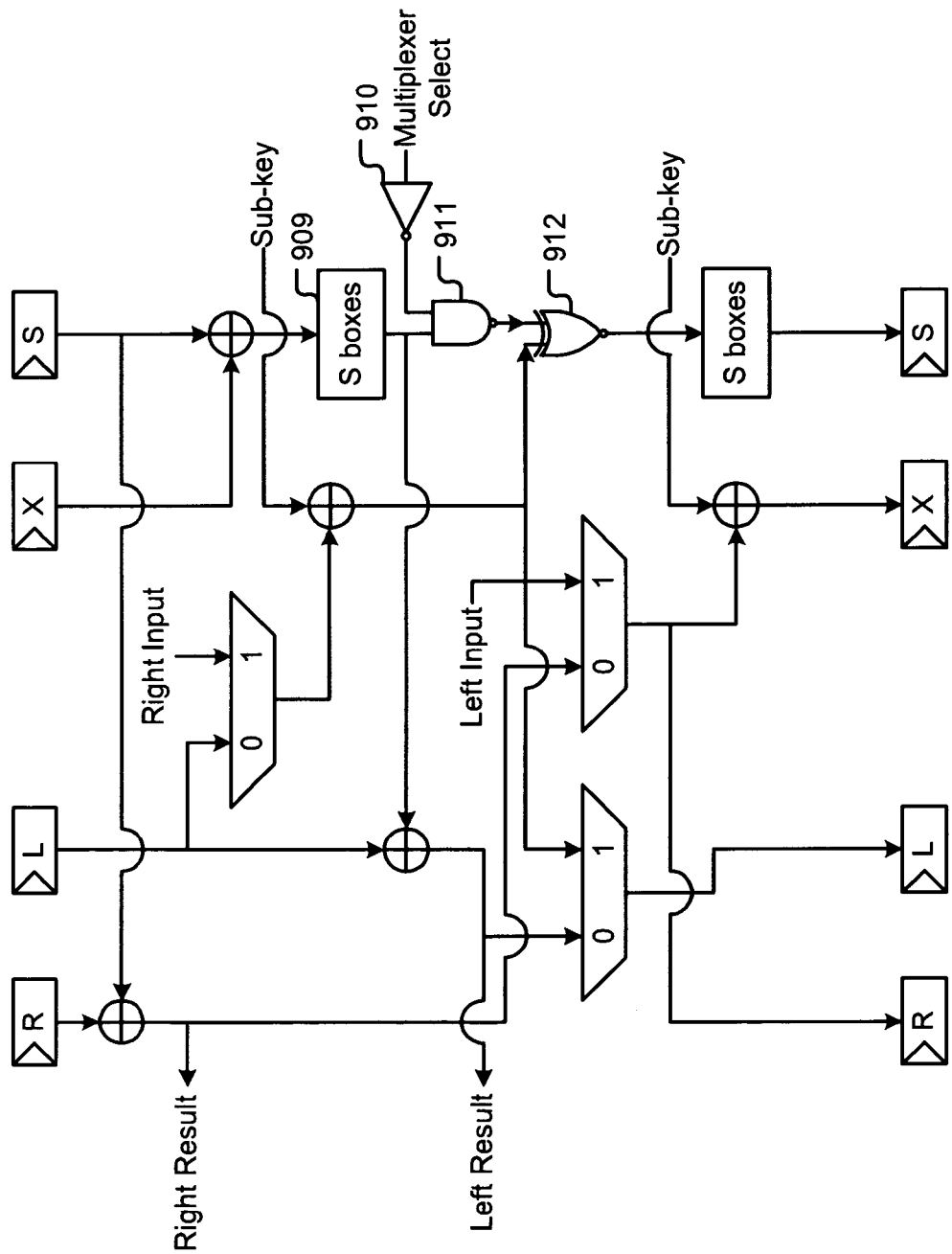

FIG. 9 presents yet another version of a DES hardware implementation that can perform two rounds per clock cycle.

Figure 10:
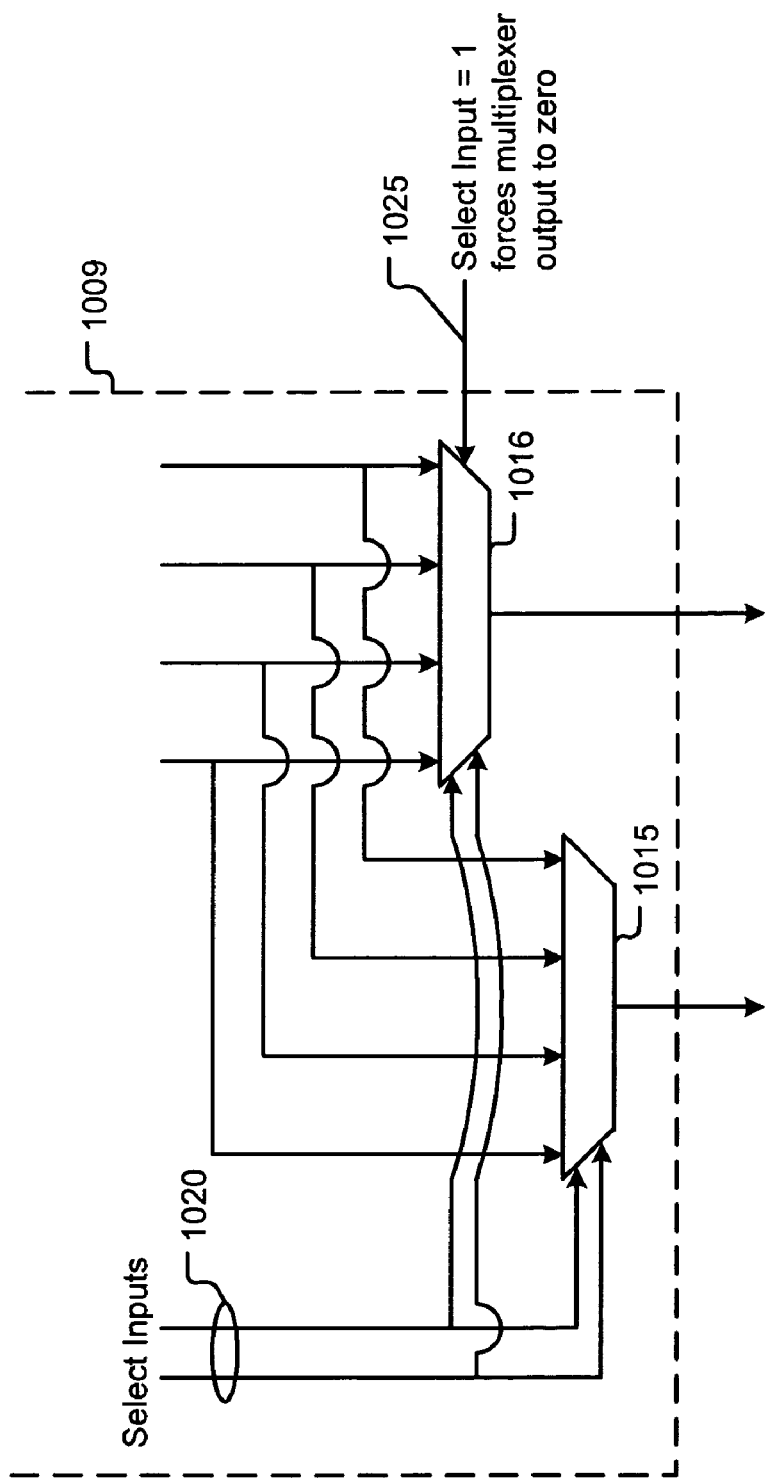

FIG. 10 presents a detailed view of a portion of an enhanced S box.

Figure 11:
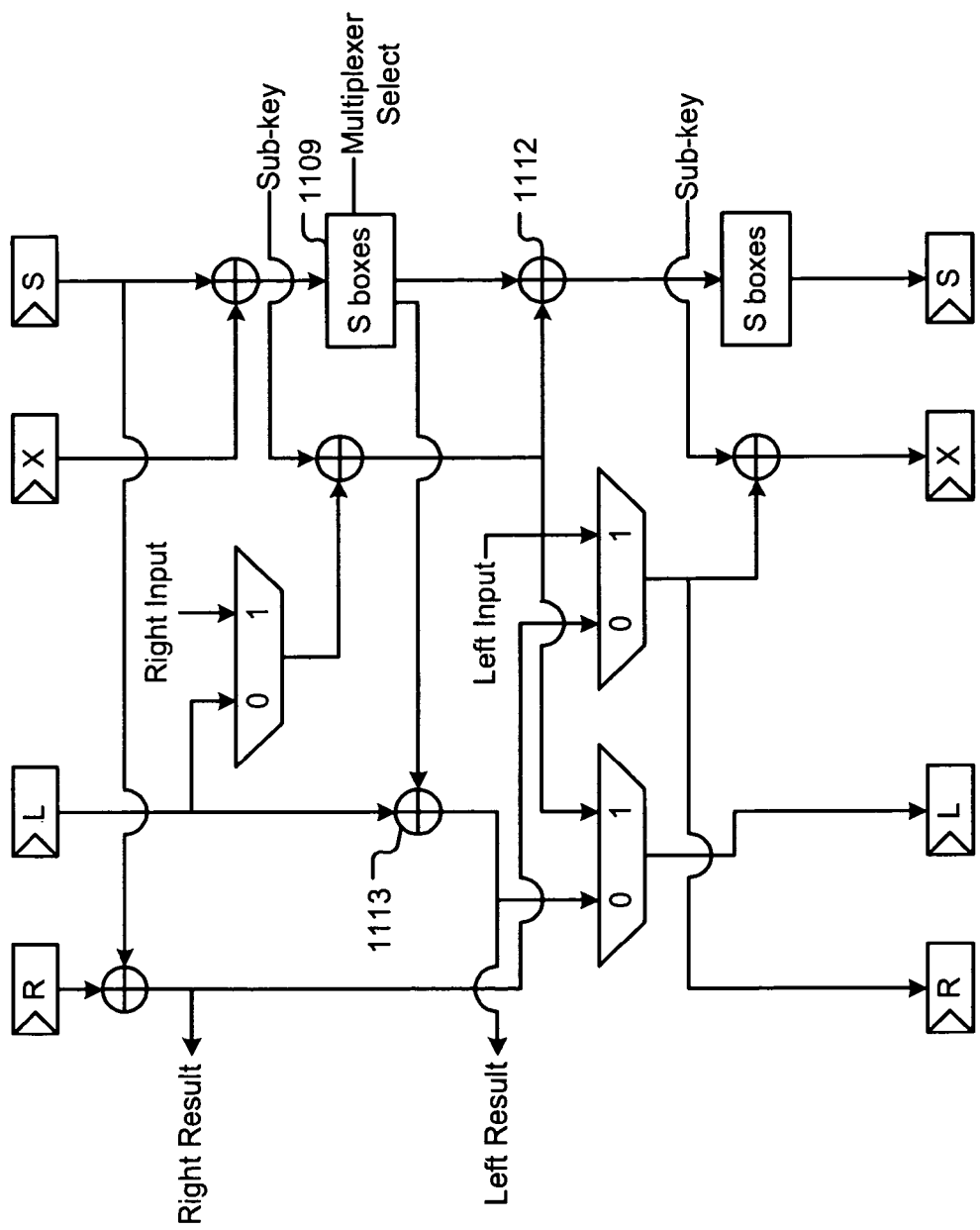

FIG. 11 presents a DES hardware implementation that utilizes enhanced S boxes.

Figure 12:
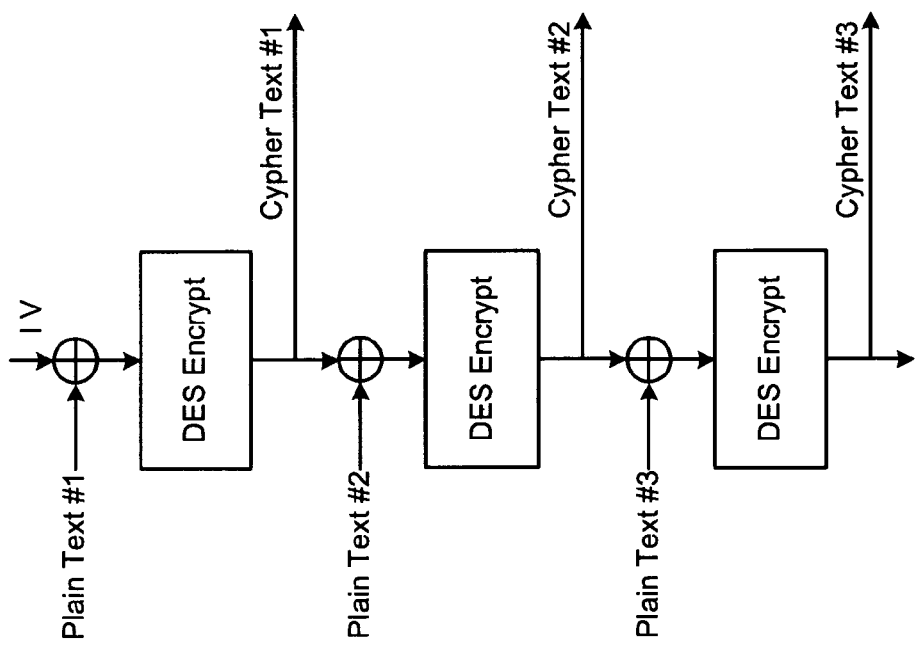

FIG. 12 presents a method of performing the Cipher Block Chaining mode of DES encryption.

Figure 13:
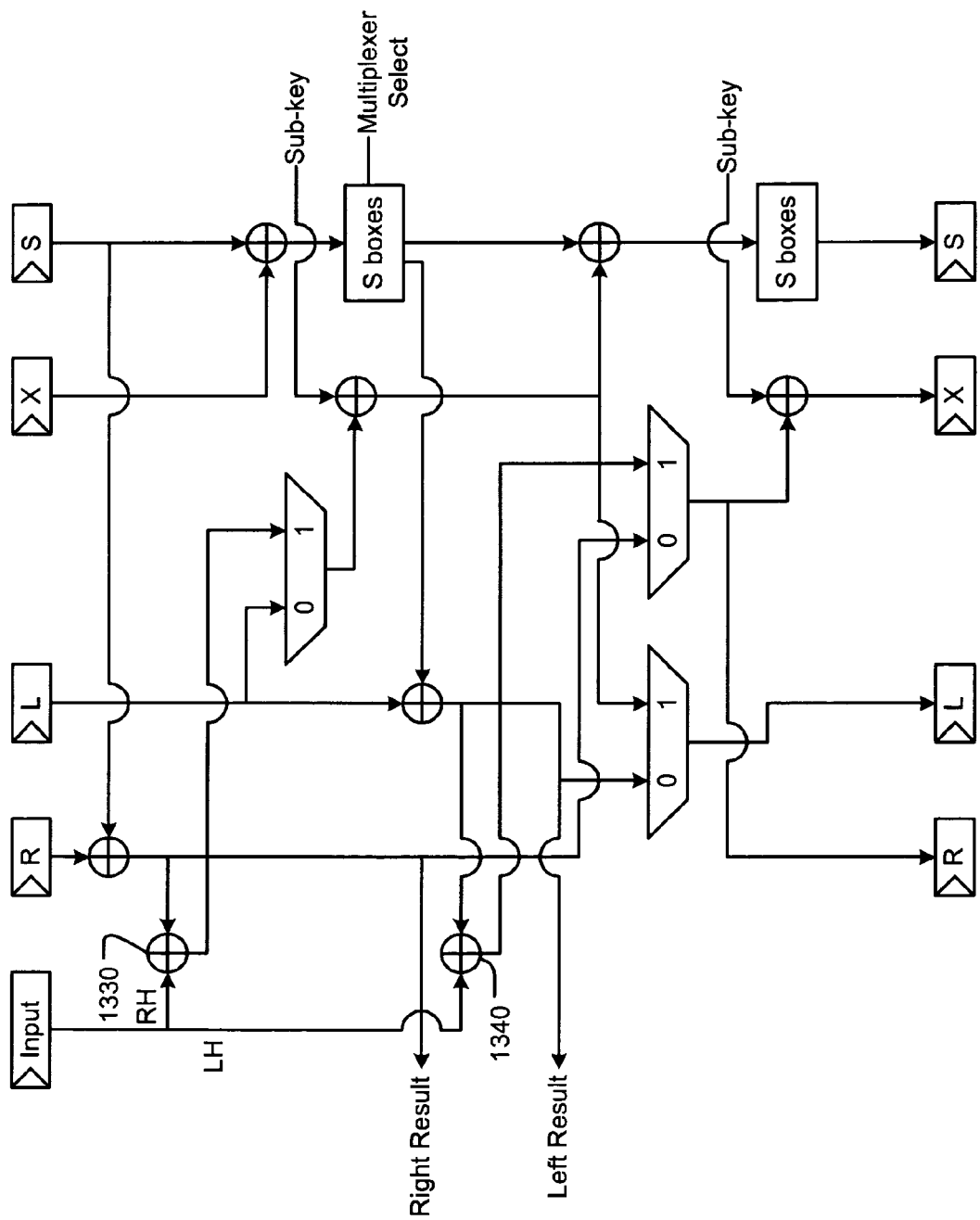

FIG. 13 presents a circuit for efficiently performing the Cipher Block Chaining mode of DES encryption.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 An Enhanced Version of a DES Hardware Implementation

Because a single 3-input exclusive-or operator is typically faster than two 2-input exclusive-or operators, replacing exclusive-or operators 302 and 303 as shown in FIG. 3 with a single 3-input exclusive-or operator can increase the speed of the DES hardware implementation. Such a hardware implementation is shown in FIG. 4.

Referring to FIG. 4, the output of S boxes 401, which corresponds to S boxes 301, together with the Left Half 1 and a 48-bit sub-key is input into a 3-input exclusive-or operator 405. The output of exclusive-or operator 405 is input into S boxes 404, which corresponds to S boxes 304. Thus, as can be seen in FIG. 4, the critical path between S boxes 401 and S boxes 404 includes only a single 3-input exclusive-or operator as opposed to two 2-input exclusive-or operators.

Because the exclusive-or of the output of S boxes 401 and the Left Half 1 are needed for future computations, exclusive-or operator 406 is configured to compute that value, which will be referred to as the Right Half 2. Note however, that exclusive-or operator 406 is not in the critical path between S boxes 401 and S boxes 404. Thus, the addition of the exclusive-or operator 406 does not increase the execution time of the hardware implementation of the DES algorithm.

Recall that permutations and expansions can be performed by routing signals without the use of transistors. Thus, such operations are not shown in FIG. 4.

5.2 Another Enhanced Version of a DES Hardware Implementation

The speed of the enhanced DES hardware implementation of FIG. 4 can be increased still further. For example, Left Half 1 and the 48-bit sub-key are known before the output of S boxes 401 is known. Thus, Left Half 1 and the 48-bit sub-key can be input into a 2-input exclusive-or operator before the output of S boxes 401 is known. Such a hardware implementation is shown in FIG. 5.

Referring to FIG. 5, the 48-bit sub-key and Left Half 1 are input into exclusive- or operator 506. This operation can occur before the output of S boxes 501 is known. The output of the exclusive-or operator 506, together with the output of S boxes 501 are input to a 2-input exclusive-or operator 505. The output of this operator 505 is then input into S boxes 504. Thus, the critical path between S boxes 501 and 504 includes only a single 2-input exclusive-or operator 505.

Because the exclusive-or of the output of S boxes 501 and Left Half 1 are needed for future computations, exclusive-or operator 507 is configured to compute that value, which will be referred to as the Right Half 2. Note however, that exclusive-or operator 507 is not in the critical path between S boxes 501 and 504. Thus, the addition of the exclusive-or operator 507 does not increase the execution time of the hardware implementation of the DES algorithm.

Recall that permutations and expansions can be performed by routing signals without the use of transistors. Thus, such operations are not shown in FIG. 5.

5.3 Yet Another Version of a DES Hardware Implementation

FIG. 5 shows a DES hardware implementation from the middle of one round (at S boxes 501) to the middle of the next round (at S boxes 504). FIG. 6 presents a hardware implementation showing 4 rounds. The top half of FIG. 6 shows two rounds that are typical of any two rounds except the first and the last. The S boxes for these rounds are labeled as the $14^{th}$ S Boxes and the $15^{th}$ S boxes, but they are typically of any even-odd pair. The bottom half of FIG. 6 shows the hardware for the last round of DES (including the $16^{th}$ S boxes) followed by the hardware for the start of another DES operation (including the $1^{st}$ S boxes).

Recall that permutations and expansions can be performed by routing signals without the use of transistors. Thus, such operations are not shown in FIG. 6.

5.4 A Version of a DES Hardware Implementation that Can Perform All 16 Rounds of DES Encryption FIG. 7 presents yet another embodiment of the invention. This embodiment can perform all 16 rounds of a Data Encryption Standard algorithm. In addition, this embodiment can perform two complete rounds of the DES algorithm in a single clock cycle.

FIG. 7 presents a hardware implementation for performing rounds of the DES algorithm. The hardware implementation includes four registers R, L, X, and S 701-704. In addition, the hardware implementation includes four multiplexers 705-708. When the selection input (not shown) of the four multiplexers 705-708 is set to zero, then the execution of the hardware implementation can perform rounds 2 through 15 of the DES algorithm. However, when the selection input of the four multiplexers 705-708 is set to one, then the hardware implementation can perform round 16 followed by round 1 of the DES algorithm. In other words, when the selection input of the four multiplexers 705-708 is set to zero, then the hardware implementation operates similar to the top half of FIG. 6. Similarly, when the selection input of the four multiplexers 705-708 is set to one, then the hardware implementation operates similar to the bottom half of FIG. 6.

One method of performing the DES algorithm with the hardware implementation shown in FIG. 7 follows. First, the selection input of the multiplexers 705-708 is set to one. Thus, during the first clock cycle, the hardware implementation will use the Right Input and the Left Input to perform the first round of DES encryption. Next, the selection inputs of the multiplexers 705-708 are set to zero. Then, during the $2^{nd}$ clock cycle, rounds 2 and 3 of the DES algorithm are performed using the values from registers 701-704. While the selection inputs of the multiplexers 705-708 remain at zero, rounds 4 and 5 are performed during the $3^{rd}$ clock cycle, rounds 6 and 7 are performed during the $4^{th}$ clock cycle, and so on until rounds 14 and 15 are performed during the $8^{th}$ clock cycle. Thus, on the $9^{th}$ clock cycle, the hardware implementation will perform the (final) $16^{th}$ round and will output the encrypted data. If the selection input of the multiplexers 705-708 is set to one, then the $9^{th}$ clock cycle can also be utilized to start the next execution of the DES algorithm. As a result, while the latency of performing the DES algorithm is 9 clock cycles, a new DES algorithm can be initiated every 8 clock cycles.

Recall that permutations and expansions can be performed by routing signals without the use of transistors. Thus, such operations are not shown in FIG. 7.

5.5 Additional Versions of Hardware Implementations of the DES Algorithm

The critical path in the hardware implementation shown in FIG. 7 runs from register S 704 back to register S 704. This critical path includes, among other things, multiplexer 708. Multiplexer 708 is not needed if the output from S boxes 709 is forced to zero when the selection input of the multiplexers 705-707 is set to one.

One structure for forcing the output from S boxes 709 to zero when the selection input of the multiplexers is set to one is shown in FIG. 8. This embodiment of the invention includes an inverter 810 that inverts the selection input of multiplexers 805-807. The output of the inverter 810 is coupled to one of two inputs of AND operator 811. The other input of the AND operator 811 is coupled to the output of S boxes 809, which corresponds to S boxes 709 of FIG. 7. The output of AND operator 811 is coupled to one of the two inputs of exclusive-or operator 812. Thus, when the multiplexer select input is set to 1, the output of the AND operator 811 will always be zero, regardless of the value output from S boxes 809. As a 2-input AND gate is typically faster than a 2-input multiplexer, the use of an AND gate can increase the speed of the DES algorithm.

Another structure for forcing the output from S boxes 709 to zero when the selection input of the multiplexers is set to one is shown in FIG. 9. This method utilizes a NAND operator 911 instead of an AND operator. The method also utilizes an XNOR operator 912 instead of an exclusive-or operator. As NAND operators are typically faster than AND operators and XNOR operators are typically the same speed as exclusive-or operators, use of a NAND operator and an XNOR operator can increase the speed of the DES algorithm.

5.6 S Box Implementations

The S boxes discussed above can be implemented using many structures. For example, the S boxes could be implemented using RAM, Read Only Memory ("ROM"), or a combination of RAM and ROM. In addition, the S boxes could be implemented as described in U.S. patent application Ser. No. 10/057,172 entitled "System and Method for Small Read Only Data," which is hereby incorporated by reference. In this embodiment of the invention, no ROM or RAM is used. Instead, the output of the S boxes in this embodiment of the invention comes from a multiplexer.

In order to eliminate the need for an AND operator 811 or a NAND operator 911 coupled to the output of the S boxes 809 and 909 respectively, an enhanced S boxes structure that has two outputs could be utilized. Such a structure is shown in FIG. 10.

As shown in FIG. 10, the enhanced S box 1009 could include two multiplexers 1015 and 1016. The input of multiplexer 1015 would be selected based upon the states of selection inputs 1020. The output of multiplexer 1015 could be one of the output data from S box 1009.

As shown in FIG. 10, multiplexer 1016 would produce the second output of S box 1009. This multiplexer has the same data inputs as multiplexer 1015. In addition to the selection inputs 1020 that multiplexer 1015 uses, multiplexer 1016 has an extra selection input 1025. When the extra selection input 1025 is zero, then the output of multiplexer 1016 is the same as the output of multiplexer 1015. However, when the extra selection input 1025 is one, then the output of multiplexer 1016 is zero.

A hardware implementation for performing the DES algorithm, which utilizes the enhanced S box 1009, is shown in FIG. 11. As shown in FIG. 11, the enhanced S boxes 1109 include two outputs. The first output is coupled to exclusive-or operator 1113 and the second output is coupled to exclusive-or operator 1112. The enhanced S boxes 1109 also include a multiplexer select that can set the second output to zero but has no effect on the output of the first output. Note that there is not an AND operator between enhanced S boxes 1109 and exclusive-or operator 1112. As a result the speed of the hardware implementation is optimized.

5.7 Hardware Implementations for Various DES Encryption Modes

As shown in FIG. 5, by moving exclusive-or operators, more than one operation may be executed at the same time. Thus, the speed of a hardware implementation of the DES algorithm may be increased. Similarly, in processing some of the modes in which DES is used, by moving exclusive-or operators, more than one operation can be executed at the same time.

For example, in cipher block chaining ("CBC") mode encryption, as shown in FIG. 12, the result of one encryption is input into an exclusive-or operator with the next plain text before the next DES encryption begins. (The first plain text is input into an exclusive-or operator with initial variable IV). Conventionally, this additional exclusive- or operation creates an additional delay, often requires an extra clock cycle, and thus slows the DES algorithm. However, as shown in FIG. 13, the extra exclusive-or operation need not slow down the DES algorithm. Instead, as shown in FIG. 13, the input text can be split into left and right halves (after the initial permutation, which is not shown). Next, the right half of the extra exclusive-or operation can be performed by exclusive-or operator 1330 during the last round (round 16) of the previous encryption at the same time as the last S box computation is being performed. These operations can be performed simultaneously because the bits for the exclusive-or operation are available at the start of the last round. Similarly, the exclusive-or operation on the left half may be performed by exclusive-or operator 1340 during the first round (round 1) of the new DES algorithm while the first S box computation is being performed. The exclusive-or operation on the left half does not slow down the new DES algorithm because the result of the operation is not needed until the end of the first round of the new DES algorithm.

The Appendix shows a hardware implementation that can perform single and triple DES including ECB mode, CBC mode, Cipher Feedback mode ("CFB"), and Output Feedback mode ("OFB"). A schedule of the multiplexer settings and when the first S box needs to provide a zero result is also provided in the appendix. An entry of X in a multiplexer setting indicates that the algorithm is not dependent upon the multiplexer selection setting.

5.8 Conclusion

The above hardware implementations for performing the DES algorithm may be utilized in creating a number of devices, such as a cryptography chip, a processor, or a memory controller, that rapidly perform DES encryption and/or decryption. Some embodiments of the invention may utilize only one of the enhancements discussed above. Other embodiments of the invention may utilize a number of the enhancements discussed above. By utilizing the above enhancements, it is possible to create an execution unit that can perform one DES round faster than would otherwise be possible. Thus, it may be possible to create an execution unit that can perform two or more DES rounds in a given clock cycle. In addition, it may be possible to perform one DES round in a shorter clock cycle than would otherwise be possible.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

It is claimed:

1. An execution unit adapted to perform a given round of the Data Encryption Standard, the execution unit comprising:
   a) a Left Half input;
   b) a Key input;
   c) a Table input;
   d) a first group of transistors configured to receive the Table input, perform a table look-up, and output data;
   e) a first exclusive-or operator having two inputs and an output, the first exclusive-or operator configured to receive the Left Half input and the Key input;
   f) a second exclusive-or operator having two inputs and an output, the second exclusive-or operator configured to receive the data output by the first group of transistors and the output of the first exclusive-or operator; and
   g) a third exclusive-or operator having two inputs and an output, the third exclusive-or operator configured to receive the Left Half input and the data output by the first group of transistors;
   h) wherein the output of the second exclusive-or operator is used as the Table input for the next round of the Data Encryption Standard;
   i) wherein the output of the third exclusive-or operator is used as a Right Half input for the next round of the Data Encryption Standard; and
   j) wherein a Right Half input from the previous round of the Data Encryption Standard is used as the Left Half input for the next round of the Data Encryption Standard.

2. The execution unit of claim 1, further comprising a second group of transistors configured to receive data output by the second exclusive-or operator.

3. The execution unit of claim 1, wherein the execution unit is operable to perform an exclusive-or operation for a CBC mode, a CFB mode, or an OFB mode of DES encryption at the same time that the first group of transistors performs one or more of the following actions: receiving the table input, performing the table look-up, and outputting data.

4. An execution unit adapted to perform a given round of the Data Encryption Standard, the execution unit comprising:
   a) a Left Half input;
   b) a Key input;
   c) a Table input;
   d) a first group of transistors configured to receive the Table input, perform a table look-up, and output data;
   e) a first exclusive-or operator having two inputs and an output, the first exclusive-or operator configured to receive the Left Half input and the Key input;
   f) a second exclusive-or operator having two inputs and an output, the second exclusive-or operator configured to receive the output of the first group of transistors and the output of the first exclusive-or operator;
   g) a third exclusive-or operator having two inputs and an output, the third exclusive-or operator configured to receive the Left Half input and the output of the first group of transistors; and
   h) a multiplexer, the multiplexer having two data inputs and an output, the first of the two data inputs configured to receive the output of the first exclusive-or operator, the second of the two data inputs configured to receive the output of the second exclusive-or operator;
   i) wherein the output of the multiplexer is used as the Table input for the next round of the Data Encryption Standard; and
   k) wherein the output of the third exclusive-or operator is used as a Left Half input for the next round of the Data Encryption Standard.

5. The execution unit of claim 4, further comprising a second group of transistors configured to receive data output by the multiplexer.

6. The execution unit of claim 4, wherein the execution unit is operable to perform an exclusive-or operation for a CBC mode, a CFB mode, or an OFB mode of DES encryption at the same time that the first group of transistors performs one or more of the following actions: receiving the table input, performing the table look-up, and outputting data.

7. An execution unit adapted to perform a given round of the Data Encryption Standard, the execution unit comprising:
   a) a Left Half input;
   b) a Key input;
   c) a Table input;
   d) a Select input;
   e) a first group of transistors configured to receive the Table input, perform a table look-up, and output data;
   f) a first exclusive-or operator having two inputs and an output, the first exclusive-or operator configured to receive the Left Half input and the Key input;
   g) an AND operator, the AND operator having two inputs and an output, the first of the two inputs of the AND operator configured to receive the output of the first group of transistors, the second of the two inputs of the AND operator configured to receive the Select input;
   h) a second exclusive-or operator having two inputs and an output, the second exclusive-or operator configured to receive the output of the AND operator and the output of the first exclusive-or operator; and i) a third exclusive-or operator having two inputs and an output, the third exclusive-or operator configured to receive the Left Half input and the output of the first group of transistors;

l) wherein the output of the second exclusive-or operator is used as the Table input for the next round of the Data Encryption Standard; and j) wherein the output of the third exclusive-or operator is used as a Left Half input for the next round of the Data Encryption Standard.

8. The execution unit of claim 7, further comprising a second group of transistors configured to receive data output by the second exclusive-or operator.

9. The execution unit of claim 7, wherein the execution unit is operable to perform an exclusive-or operation for a CBC mode, a CFB mode, or an OFB mode of DES encryption at the same time that the first group of transistors performs one or more of the following actions: receiving the table input, performing the table look-up, and outputting data.

10. An execution unit adapted to perform a given round of the Data Encryption Standard, the execution unit comprising:

a) a Left Half input;

b) a Key input;

c) a Table input;

d) a Select input;

e) a first group of transistors configured to receive the Table input and the Select input, perform a table look-up, and output, via a first output, the result of the table look-up, the first group of transistors further configured to output the result of the table look-up, via a second output, if the Select input is a first value, and configured to output a zero, via the second output, if the Select input is a second value;

f) a first exclusive-or operator having two inputs and an output, the first exclusive-or operator configured to receive the Left Half input and the Key input;

g) a second exclusive-or operator having two inputs and an output, the second exclusive-or operator configured to receive the result output via the second output of the first group of transistors and the output of the first exclusive-or operator; and h) a third exclusive-or operator having two inputs and an output, the third exclusive-or operator configured to receive the result output via the first output of the first group of transistors and the Left Half input;

m) wherein the output of the second exclusive-or operator is used as the Table input for the next round of the Data Encryption Standard; and i) wherein the output of the third exclusive-or operator is used as a Left Half input for the next round of the Data Encryption Standard.

11. The execution unit of claim 10, further comprising a second group of transistors configured to receive data output by the second exclusive-or operator.

12. The execution unit of claim 10, wherein the execution unit is operable to perform an exclusive-or operation for a CBC mode, a CFB mode, or an OFB mode of DES encryption at the same time that the first group of transistors performs one or more of the following actions: receiving the table input, performing the table look-up, and outputting data.

* * * * *